US008803887B2

(12) United States Patent
McAdams et al.

(10) Patent No.: US 8,803,887 B2
(45) Date of Patent: Aug. 12, 2014

(54) COMPUTER GRAPHIC SYSTEM AND METHOD FOR SIMULATING HAIR

(75) Inventors: Aleka McAdams, Los Angeles, CA (US); Andrew Selle, North Hollywood, CA (US); Kelly Ward, Studio City, CA (US); Eftychios Sifakis, Marina Del Rey, CA (US); Joseph Teran, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 743 days.

(21) Appl. No.: 12/688,056

(22) Filed: Jan. 15, 2010

(65) Prior Publication Data

US 2010/0277475 A1    Nov. 4, 2010

Related U.S. Application Data

(60) Provisional application No. 61/175,327, filed on May 4, 2009.

(51) Int. Cl.
*G06T 15/00* (2011.01)
*G06T 19/00* (2011.01)
*G06T 13/40* (2011.01)

(52) U.S. Cl.
CPC ................ *G06T 19/00* (2013.01); *G06T 13/40* (2013.01)
USPC ........... 345/473; 345/419; 345/474; 345/475

(58) Field of Classification Search
CPC .............................. G06T 19/00; G06T 13/40
USPC .................................. 345/419, 473, 474, 475
See application file for complete search history.

(56) References Cited

U.S. PATENT DOCUMENTS

| | | |
|---|---|---|
| 6,208,348 B1 | 3/2001 | Kaye |
| 6,515,659 B1 | 2/2003 | Kaye et al. |
| 6,686,926 B1 | 2/2004 | Kaye |
| 7,102,633 B2 | 9/2006 | Kaye |
| 7,116,323 B2 | 10/2006 | Kaye |
| 7,116,324 B2 | 10/2006 | Kaye |
| 7,348,973 B1 * | 3/2008 | Gibbs et al. ................... 345/419 |
| 7,450,122 B2 | 11/2008 | Petrovic et al. |
| 7,468,730 B2 * | 12/2008 | Petrovic et al. ............... 345/473 |

(Continued)

OTHER PUBLICATIONS

Bridson, R., R. Fedkiw and J. Anderson, "Robust Treatment of Collisions, Contact and Friction for Cloth Animation." (Acm Trans. Graph. 21.3 (2002): 10 pages.

(Continued)

*Primary Examiner* — Phu K Nguyen
(74) *Attorney, Agent, or Firm* — Dorsey & Whitney LLP

(57) ABSTRACT

A computer graphic system and methods for simulating hair is provided. In accordance with aspects of the disclosure a method for hybrid hair simulation using a computer graphics system is provided. The method includes generating a plurality of modeled hair strands using a processor of the computer graphics system. Each hair strand includes a plurality of particles and a plurality of spring members coupled in between the plurality of particles. The method also includes determining a first position and a first velocity for each particle in the plurality of modeled hair strands using the processor and coarsely modeling movement of the plurality of modeled hair strands with a continuum fluid solver. Self-collisions of the plurality of modeled hair strands are computed with a discrete collision model using the processor.

24 Claims, 15 Drawing Sheets

(56) References Cited

U.S. PATENT DOCUMENTS

| | | | | |
|---|---|---|---|---|
| 7,609,261 | B2* | 10/2009 | Gibbs et al. | 345/419 |
| 7,872,654 | B2* | 1/2011 | Scapel et al. | 345/473 |
| 7,880,744 | B2* | 2/2011 | Bruderlin et al. | 345/581 |
| 8,026,911 | B2* | 9/2011 | Leveque et al. | 345/419 |
| 8,169,438 | B1* | 5/2012 | Baraff et al. | 345/473 |

OTHER PUBLICATIONS

Zhu, Y., and R. Bridson, "Animating Sand as a Fluid." (Acm Trans. Graph. 27, 3 (2005): pp. 965-972.

Zhu, Y., "Animating Sand as a Fluid." MS thesis. The University of British Columbia, British Columbia, 2005, 51 pages.

Losasso, F, J. Talton, N. Kwatra and R. Fedkiw, "Two-Way Coupled SPH and Particle Level Set Fluid Simulation." (2008), 7 pages.

Rasmussen, N., D. Enright, D. Nguyen, S. Marino, N Sumner, W. Geiger, S. Hoon, and R. Fedkiw, "Directable Photorealistic Liquids." Eurographics/Acm Siggraph Symposium on Computer Animation (2004), 10 pages.

Sifakis, E., S. Marino and J. Teran, "Globally Coupled Impulse-Based Collision Using Volume Preserving Impulses." Acm Siggraph/ Eurographics Symposium on Computer Animation (2008), 7 pages.

Harmon, D., Vouga, E., Tamstorf, R and Grinspun, E. "Robust Treatment of Simultaneous Collisions." Acm Trans. Graph., 27:3, 1-4 (2008).

A. Selle, J. Su, G. Irving, and R. Fedkiw, "Robust High-Resolution Cloth Using Parallelism, History-Based Collisions and Accurate Friction." Ieee Transactions on Visualization and Computer Graphics, 15(2), 2009, pp. 339-350.

Sethian, J.A., "A Fast Marching Level Set Method for Monotonically Advancing Fronts," Proc. Nat. Acad. Sci., 93:4, pp. 1591-1595 (1996).

Zinke, A. et al., "Dual Scattering Approximation for Fast Multiple Scattering in Hair," ACM Transactions on Graphics, vol. 27(3), Article 32 (2008), 10 Pages.

Anjyo, K., Usami, Y., and Kurihara, T., "A Simple Method for Extracting the Natural Beauty of Hair." Computer Graphics (Proc. ACM SIGGRAPH 92), ACM, vol. 26, Jul. 2, 1992, pp. 111-120.

Bando, Y., Chen, B.-Y., and Nishita, T. "Animating Hair With Loosely Connected Particles." in Comp. Graph. Forum (Eurographics Proc.), 22(3), 2003, pp. 411-418.

Bergou, M., Wardetzky, M., Robinson, S., Audoly, B., and Grinspun, E. "Discrete Elastic Rods." Acm Trans. Graph. 27, 3, 2008, 12 pages.

Bertails, F., Kim, T.-Y., Cani, M.-P., and Neumann, U. "Adaptive Wisp Tree—A Multiresolution Control Structure for Simulating Dynamics Clustering in Hair Motion." Eurographics/Siggraph Symposium on Compututer Animation, 2003, pp. 207-213.

Bertails, F., Ménier, C., and Cani, M .-P. "A Practical Self-Shadowing Algorithm for Interactive Hair Animation," In Graph. Interface, 2005. , 8 pages.

Bertails,F ., Audoly, B., Cani, M.-P., Querleux, B., Leroy, F., and Lévêque, J.-L. "Super-Helices for Predicting the Dynamics of Natural Hair.".Acm Trans. Graph. 25, 3, 2006, 8 pages.

Bridson, R., Fedkiw, R., and Anderson, J. "Robust Treatment of Collisions, Contact and Friction for Cloth Animation," Acm Trans. Graph. 21, 3, 2002, 8 pages.

Bridson, R., Marino, S., and Fedkiw, R. "Simulation of Clothing With Folds and Wrinkles." In Proc. of the 2003 Eurographics/Siggraph Symposium on Computer Animation, 2003, 10 pages.

Brown, J ., Latombe, J.-C., and Montgomery, K. "Real-Time Knot-Tying Simulation." Vis. Comput. 20, 2, 2004, 8 pages.

Carlson, M., Mucha, P., Van Horn III, R., and Turk, G. "Melting and Flowing." In Acm Trans. Graph. (Siggraph Proc.), vol. 21, pp. 167-174, (2002).

Chang, J., Jin, J., and Yu, Y. "A Practical Model for Hair Mutual Interactions." In Acm Siggraph/Eurographics Symp. on Comp. Anim., 2002, 9 pages.

Choe, B., and Ko, H.-S. "A Statistical Wisp Model and Pseudophysical Approaches for Interactive Hairstyle Generation." Ieee Transactions. On Visual. And Computer Graphics. vol. 11, 2, 2005, pp. 160-170.

Choe, B., Choi, M., and Ko, H.-S. "Simulating Complex Hair With Robust Collision Handling." in Proc. of Eurographics/Acm Siggraph Symposium on Computer Animation, 2005, 8 pages.

Grégoire, M., and Schomer, E. "Interactive Simulation of One-Dimensional Flexible Parts." In Symp. on Solid and Physical Modeling, 2006, pp. 95-103.

Grégoire, M., and Schomer, E. "Interactive Simulation of One-Dimensional Flexible Parts." DaimlerChrysler Research and Technology, Johannes Gutenberg Universität Mainz, Germany, 2007, pp. 1-30.

Gupta, R ., Montagnol, M., Volino, P., and Magnenat-Thalmann, N. "Optimized Framework for Real Time Hair Simulation," In CGI Proc. 2006, 8 pages.

Hadap, S ., and Magnenat-Thalman, N. "Modeling Dynamic Hair as a Continuum." In Comp. Graph. Forum (Eurographics Proc.), vol. 20 (3), 2001, 10 pages.

Hadap, S. "Oriented Strands—Dynamics of Stiff Multi-body System." In SCA '06: Proc. of the 2006 Acm Siggraph/Eurographics Symposium on Computer Animation, 2006, pp. 91-100.

Kim, T.-Y., and Neumann, U,. "Interactive Multiresolution Hair Modeling and Editing." Acm Trans. Graph. 21,3, 2002, 10 pages.

Moon, J. T., Walter, B., and Marschner, S. "Efficient Multiple Scattering in Hair Using Spherical Harmonics". Acm Trans. Graph. 27, 3, 2008, pp. 1-7.

Pai, D. K. Strands: "Interactive Simulation of Thin Solids Using Cosserat Models." In Proc. of Eurographics, vol. 21 (3) of Comput. Graph. Forum, Eurographics Assoc., 21(3), 2002, 6 pages.

Petrovic, L, ., Henne, M., and Anderson, J,. "Volumetric Methods for Simulation and Rendering of Hair." Tech. Rep., Pixar Animation Studios, 2005, pp. 1-6.

Plante, E., Cani, M. -P., and Poulin, P. "Capturing the Complexity of Hair Motion." Graph. Models 64, 2002, pp. 40-58.

Premoze, S., Tasdizen, T., Bigler, J., Lefohn, A., and Whitaker, R. "Particle-Based Simulation of Fluids." In Comp. Graph. Forum (Eurographics Proc.), vol. 22(3), 2003, 10 pages.

Rosenblum, R,.Carlson, W. E., and Tripp 111, E. "Simulating the Structure and Dynamics of Human Hair: Modelling, Rendering and Animation" The Journal of Visualization and Computer Animation. vol. 2, 1991, 141-148.

Selle, A., Lentine, M., and Fedkiw, R. "A Mass Spring Model for Hair Simulation." Acm Trans. Graph. 27,3, 2008, pp. 1-11.

Spillmann, J. , and Teschner, M. "Corde: Cosserat Rod Elements for the Dynamic Simulation of One-Dimensional Elastic Object." In Proc. of Eurographics/Acm Siggraph Symposium on Computer Animation, 2007, pp. 1-10.

Stam, J. "Stable Fluids." In Proc. of Siggraph 99, 1999, pp. 121-128.

Ward, K., and Lin, M. C. "Adaptive Grouping and Subdivision for Simulating Hair Dynamics." In Pacific Graph., 2003, 10 pages.

Ward,K ., Lin, M. C., Lee, J., Fisher,S ., and Macri, D . "Modeling Hair Using Level-of-Detail Representations." in Proc. of Comput. Anim. and Social Agents (CASA), 2003, 7 pages.

Ward, K., Bertails, F., Kim, T.-Y., Marschner, S. R., Cani, M.-P., and Lin, M. C. "A Survey on Hair Modeling: Styling, Simulation and Rendering." Ieee Transactions on Visualization and Computer Graphics, vol. 13( 2), 2007, pp. 213-234.

Yu, Y. "Modeling Realistic Virtual Hairstyles." In Pacific Graph., 2001, pp. 1-10.

* cited by examiner

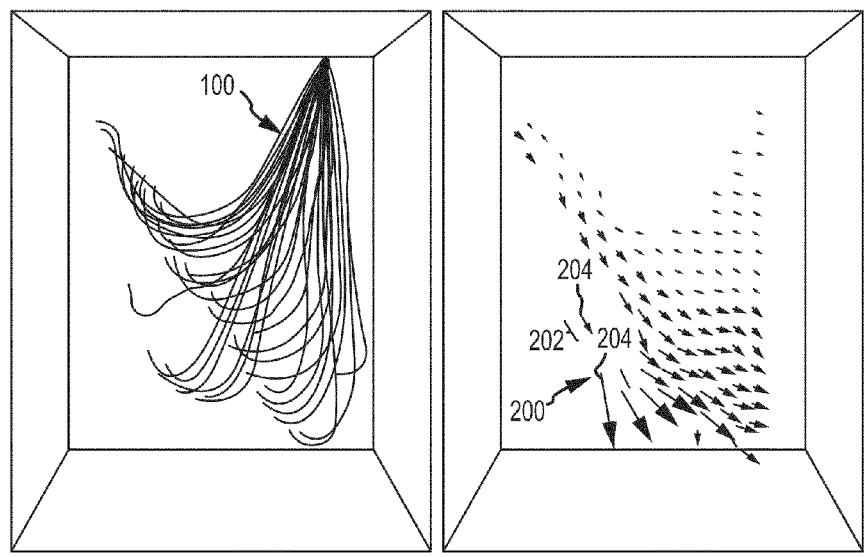

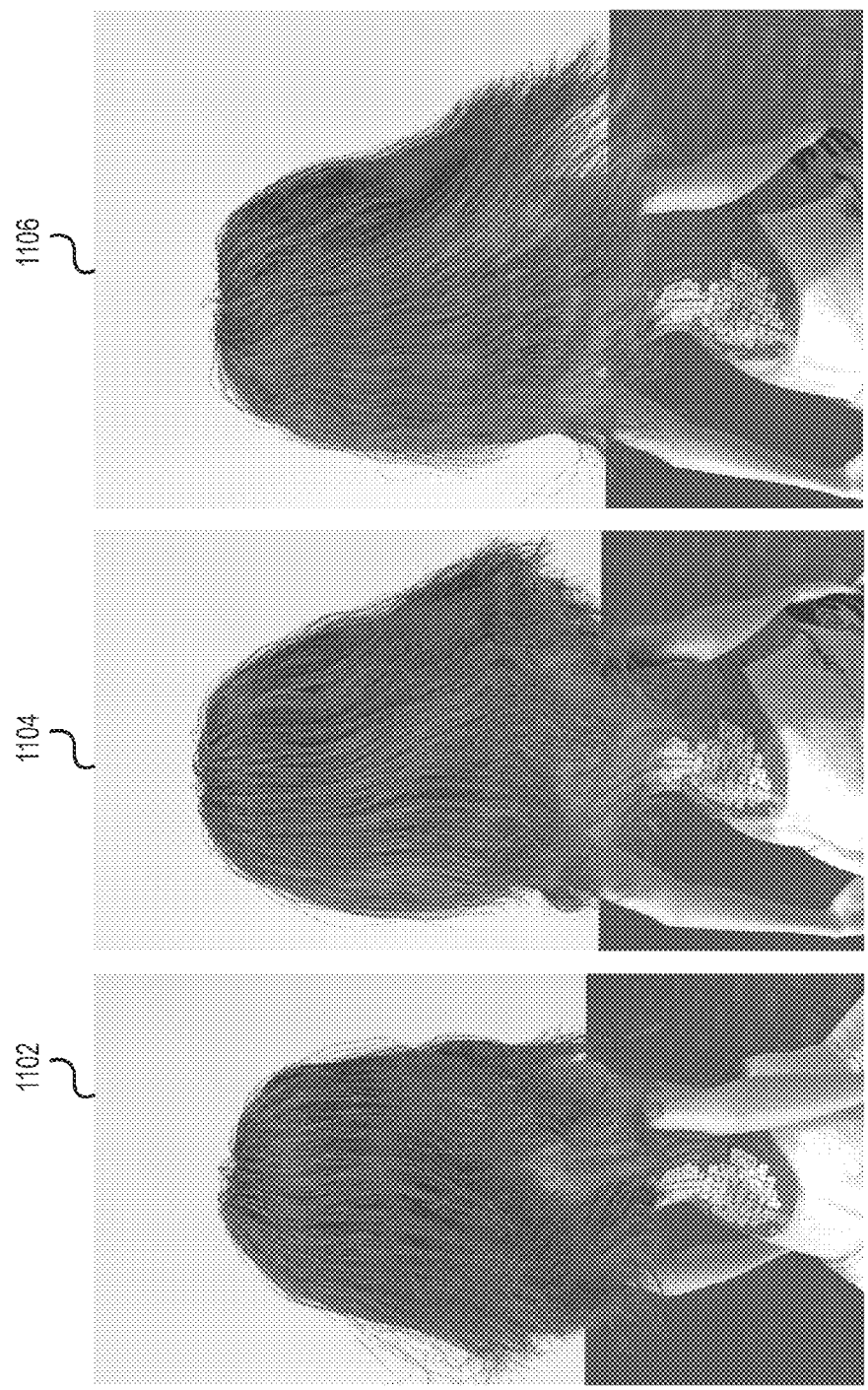

COMPUTER GRAPHIC SYSTEM AND METHOD FOR SIMULATING HAIR

CROSS-REFERENCE TO RELATED APPLICATIONS

The present application claims the benefit under 35 U.S.C. §119(e) to U.S. Provisional Patent Application No. 61/175,327, which was filed on May 4, 2009, and entitled "Detail Preserving Continuum Hair Simulation," which is incorporated by reference into the present application in its entirety.

TECHNICAL FIELD

Aspects of the present disclosure relate generally to computer animation and, more specifically, to hair simulation in computer generated animation.

BACKGROUND

The simulation of hair is widely implemented in computer graphics, as hair is an integral part of creating many virtual characters. Many approximations for simulating hair exist, but they typically fail to provide the amount of detail that real hair exhibits. Several applications, such as feature films, aim to capture the high degree of complexity caused by several thousand interacting hair strands. Unfortunately, the massive number of hairs interacting and colliding makes hair simulation on a virtual character one of the most challenging aspects of computer graphics. Even though individual hair dynamics scale well to multiple hairs (as each hair is dynamically uncoupled), accurately simulating many hairs interacting with each other remains a challenge.

Numerous approaches have been developed to manage the complexity of many hairs interacting. Generally, these approaches simulate a smaller set of guide hairs (typically no more than several hundred) that interact with large repulsion forces, interpolating a larger number of hairs for rendering. This leads to very efficient simulation times, but a limited amount of hair detail is captured (especially stray hairs such as the so-called "flyaways") because, essentially, each guide hair represents hundreds (or even thousands) of actual hairs.

Alternatively, there have been several methods that treat every simulated hair as part of a fluid-like continuum volume. These approaches naturally model hair interaction without explicit collisions. However, intricate features of individual hairs are lost because each hair is part of the continuum.

The foregoing is believed to be helpful in providing the reader with background information to facilitate a better understanding of the various aspects of the present disclosure. Accordingly, it should be understood that these statements are to be read in this light, and not as admission of prior art.

SUMMARY

One aspect of the disclosure may involve a method for hybrid hair simulation using a computer graphics system. The method includes generating a plurality of modeled hair strands using a processor of the computer graphics system. Each hair strand includes a plurality of particles and a plurality of spring members coupled in between the plurality of particles. The method also includes determining a first position and a first velocity for each particle in the plurality of modeled hair strands using the processor and coarsely modeling movement of the plurality of modeled hair strands with a continuum fluid solver. Self-collisions of the plurality of modeled hair strands are computed with a discrete collision model using the processor.

Another aspect of the disclosure may involve a Eulerian and Lagrangian hybrid method of artificial hair simulation using a computer graphics system. The method includes determining an initial position and a velocity for each of a plurality of hair strands and computing a backward Euler solve for each of the plurality of hair strands. The velocity of each of the plurality of hair strands is rasterized to a three-dimensional grid and, using a volume technique, modifying the velocity into a corrected divergence free velocity. The modified velocity is interpolated out of the three-dimensional grid and further modified to satisfy body and self-collisions. A final position of each of the plurality of hair strands is computed.

Yet another aspect of the disclosure may involve a computer graphics system for simulating hair using a Eulerian/Lagrangian hybrid method. The computer graphics system includes at least one processor and at least one computer readable medium communicatively coupled to the at least one processor. The at least one computer readable medium includes code executable by the at least one processor to determine a first collision-free location and a first velocity for each particle of one or more computer generated stands of hair. Additionally, the code is executable by the processor to rasterize the first velocity to a grid, compute a second velocity of the computer graphic strands of hair for the second velocity being divergent free and apply a fluid implicit particle (FLIP) solver to the second velocity to interpolate the second velocity to the particles. The computer graphics system computes body and self-collisions of the one or more strands of hair and determines a final position of the one or more computer graphic strands of hair.

These and other advantages, aspects and features of the present disclosure will become apparent to those of ordinary skill in the art upon reading this disclosure in its entirety.

BRIEF DESCRIPTION OF THE DRAWINGS

FIG. 1 illustrates hair simulated as curves.

FIG. 2 illustrates hair simulated as velocities.

FIGS. 11A-D illustrates another example implementation of the hybrid method of hair simulation on an animated character.

DETAILED DESCRIPTION

Figure 3:
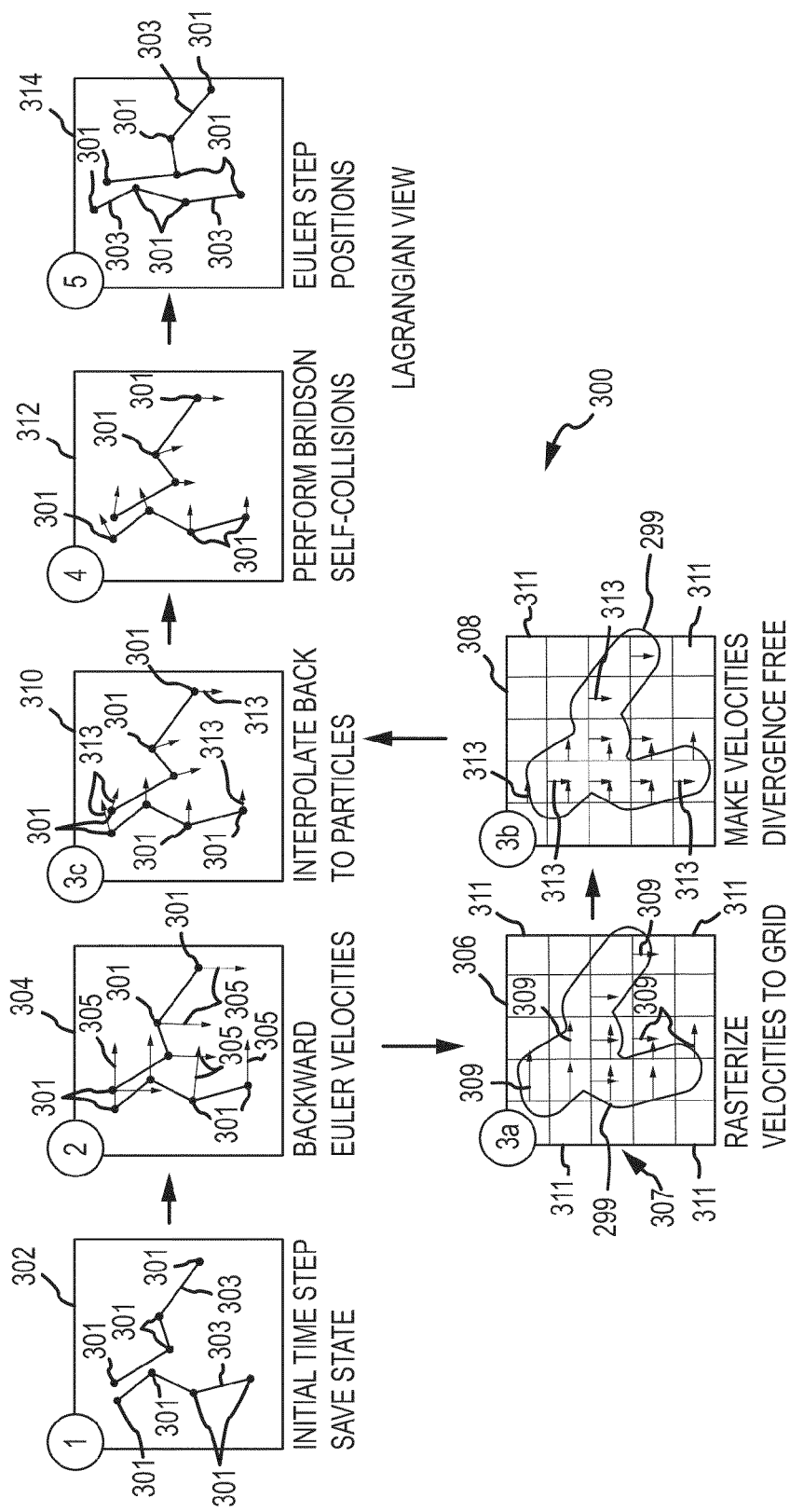
FIG. 3 is a flowchart illustrating a hybrid method of simulating hair combining a coarse Eulerian method and a fine Lagrangian technique.

Aspects of the present disclosure involve systems and methods for graphically simulating hair. More specifically, the present disclosure provides systems and methods for simulating the movement of hair, such as the movement of hair on an animated character. Generally, the simulation considers the hair movement in discrete time-steps and, in each time-step, the hair is modeled as fluid before hair-to-hair collisions are considered. Modeling the hair as a fluid efficiently manages most of the various interactions that occur as the hair moves, thus alleviating some burden of the hair-to-hair collision computation.

Accordingly, the hair simulation may generally be considered as two parts. The first part is a coarse, highly-coupled volumetric behavior simulation, which is efficiently modeled by a continuum. The second part is a finer, more locally-coupled Lagrangian particle simulation of hair. Unlike previous continuum-based approaches that only simulate guide hairs that do not interact directly, the present technique simulates many hairs (e.g., thousands) that are allowed to collide directly as well as through the volume. Self-collisions are more efficiently handled with the two-part simulation than with fully Lagrangian collision models because the volume continuum modeling does most of the work towards resolving collisions. Thus, the present approach combines a Lagrangian hair solver with a fluid simulator and can capture the intricate details of many individual strands while efficiently maintaining the overall hair volume.

FIG. 1 illustrates the hair modeled as curves 100. In the techniques discussed herein, the hair is modeled as curves as a starting point and an end point for each time-step. Generally, the curves 100 may be implemented using any one of a variety of different constitutive methods for modeling individual hair strands or clumps of hair. For example, generalized (reduced) coordinate models or rigid body models may be used. In the generalized coordinate model, particles degrees of freedom are defined implicitly by linking to one or more other particles. In one embodiment, a mass/spring system and projective dynamics may be used. Mass/spring simulated lattice deformers can be added to model torsion. In the rigid body models, position and orientation are known and may include using rigid body chaining methods or techniques based on elastic rod theory. More accurate models such as the elastic rod theory, use continuum mechanics to define forces on particles. Yet another embodiment includes modeling of a twist as deviation from a canonical frame as well as a method to evolve this separately quasistatically.

In the interest of simplicity, a mass/spring model will be used for the hair curves described herein. In the mass/spring model, each particle (i.e., mass) in sequence is connected with a spring and every other particle with a bending spring. It should be understood, however, that torsion could be added to the mass/spring model or a different strand model may be implemented (such as a articulated rigid body or Cosserat model).

FIG. 2 illustrates the modeling of hair as a volume of velocities represented by arrows 200 in accordance with the volumetric behavior simulation. In FIG. 2, the arrows 200 indicate grid velocities after being rasterized and made divergence free. The magnitude of the grid velocity is represented by the length 202 of each arrow 200. Additionally, a base 204 of each arrow 200 represents the position of grid cell centers in and the arrow 200 points the direction the grid cell center is moving.

There are various different possible approaches to modeling hair as a volume. Generally, a Eulerian volume model may be implemented. More particularly, in one embodiment, a fluid implicit particle FLIP based fluid solver may be implemented. The volume modeling is performed prior to the Lagrangian self-collisions, providing efficiency gains as most collisions are handled in the volume model rather than the computationally intensive Lagrangian self-collisions.

FIG. 3 is a flowchart illustrating a method for modeling hair (Block 300) in accordance with an example embodiment. More specifically, the flowchart illustrates a single time-step that is repeated iteratively to model hair throughout a full course of movement. The duration of the time-step may generally be a fraction of a second, but may vary in different actual implementations depending on a velocity of the hair during the movement. Typically, as the velocity of the hair increases, the duration of the time step is reduced to provide sufficient continuity of movement and maintain tractability. The movement of the hair is defined by the forces in the system, such as gravity and the spring forces, and the positions and velocities of the particles evolve as the hair moves and collisions occur.

For each time-step, a collision-free position and velocity is initially saved for each particle (Block 302). That is, a position and velocity is determined and stored in memory and the collision-free position and velocity serve as a start-point for the hair movement. In Block 302, the position of particles 301 of two curves 303 are illustrated and represent simulated hair strands. The curves 303 may represent multiple strands Backward Euler velocities are computed from the initial position and velocity (Block 304). In Block 304, the velocities of the particles are illustrated as arrows 305 extending from each particle 301. In particular, for each particle 301, the velocity for the time-step is computed using the equation $v^{*n+1}_i = v^n_i + \Delta t a_i(x^n_i, v^{*n+1}_i)$, where $v_i$ is the velocity and $x_i$ is the position for the $i^{th}$ particle and $t_n$ is the time step. The acceleration term $(a_i(x^n_i, v^{*n+1}_i))$ is separated into a linear damping part and a non-linear elastic part to preserve elastic modes. Elastic modes refer to parts of deformation that come from relieving elastic energy. For example, if a guitar string is plucked, the elastic modes cause it to vibrate. When the string is dampened, with a hand, for example, that is a damping (or diffusive) force. Elastic modes give hair some of its interesting properties. If they are not preserved, then the damping modes dominate making simulations appear too slow, as if underwater.

Once the velocities are determined, a volume technique is employed to modify the computed velocity $v^{*n+1}_i$ into a corrected velocity $v^{n+1}_i$. In one embodiment, this is accomplished using a Eulerian technique by first rasterizing the velocities to a grid (Block 306). Block 306 shows the grid 307 with representative velocities 309 in each grid cell 311. The grid 307 represents the hair density and each grid cell 311 is three dimensional to account for the multi-dimensional movement of the hair strands. Specifically, hair density is represented by the silhouette 299. Although the silhouette 299 gives the appearance of uniform density, depending on a weighting kernel that is used, the density may have a gradient.

The velocities (e.g., arrows 305) are modified to account for bulk self-interaction by making the velocities divergence free (Block 308). That is, for each arrow 305, it is determined if there is any overlap with another arrow 305. Overlap of arrows 305 indicates a collision and a modified velocity 313 is computed to account for the collision. Within the grid structure, particle position and, therefore, arrow 305 position is known relative to the grid cells 311. Collisions are implicitly known to occur wherever the rasterized grid 307 has non-zero divergence.

Once the velocities have been modified to account for collisions, the modified velocity 313 information is applied back into particle velocities (Block 310). That is, the information is interpolated out of the grid cells 311 and back into the particle representation. The steps represented in Block 306-310 serve as pre-conditioning steps for performing the locally-coupled Lagrangian simulation. Because bulk collisions are handled by the grid 307, the Lagrangian simulation is less computationally intensive.

Once returned to particle velocities, self-collisions are accounted for (Block 312) and the Euler step positions are determined (Block 314). In one embodiment, the self-collisions may be accounted for using Bridson techniques and, as such, Bridson, R., R. Fedkiw and J. Anderson, "Robust Treatment of Collisions, Contact and Friction for Cloth Animation," (ACM TRANS. GRAPH. 21.3 (2002): 594-603), is hereby incorporated by reference in its entirety and for all purposes. Other embodiments may implement other techniques. The final positions may subsequently be used as an initial position for a subsequent iteration of the time step process.

The following discussion explains in greater detail the steps of Blocks 306-312, as well as other features associated with the method 300 of FIG. 3. Specifically, the volume method for handling bulk collisions, separation techniques for divergent velocity fields, the locally-coupled Lagrangian techniques, and a graphics system for implementing the hybrid technique and test results are discussed in greater detail.

Volume Method

A volume method, such as the method shown in FIG. 3 at Block 306-310, is one way to process self-interaction of many hairs. When many real hairs are near each other or closely coupled, their contact and collisions allow a propagation of any force through other hairs in contact. This behavior is similar to the behavior of a fluid, which conserves momentum and mass. Hence, in some embodiments, for computational efficiency, hair may be modeled as an incompressible fluid.

Two conventional approaches to model fluid volumes are Lagrangian techniques (e.g., smoothed particle hydrodynamics (SPH), or vortex particle methods) and Eulerian techniques (e.g., common pressure/velocity incompressible solvers). Selection of one technique over another generally involves a trade off. Standard SPH effectively handles compressible flow, but Eulerian techniques tend to be more efficient than Lagrangian techniques for modeling fluid volumes because nearest neighbor searches are unnecessary. Contrarily, the Eulerian approaches implements uniform grids that limit the amount of detail available. Vortex particle based methods limit detail because high degree unstructured stencils create numerical smoothing. In the present hybrid technique, lack of detail resulting from use of any one particular conventional volume method as a first part of the process is overcome by implementing Lagrangian techniques in the second part of the process to capture high fidelity detail after the volume method. Furthermore, the high-fidelity interactions are tractable in the present technique.

In one embodiment, a traditional Eulerian advection equation of velocity $v_t + v\nabla \cdot v = 0$ is implemented for fluid advection. Fluid advection refers generally to transport with a general flow of a fluid. In another embodiment, a FLIP method is implemented which replaces the traditional Eulerian advection equation of velocity with a Lagrangian Euler step $x_i^{n+1} = x_i^n + \Delta t v_i^n$. This velocity is rasterized to a grid and made divergence free using the Chorin projection method. Generally, the Chorin projection method is a two-stage process that includes computing an intermediate velocity and projecting the intermediate velocity with a pressure to a divergence-free velocity field. The divergence free velocity field is compared to the original grid velocity field, and this difference is interpolated to the particles and applied as an impulse. Zhu, Y., and R. Bridson, "Animating Sand as a Fluid," (ACM TRANS. GRAPH. 27, 3 (2005): 965-972), details the use of the FLIP method and is hereby incorporated by reference in its entirety and for all purposes.

The FLIP method provides a convenient way to transition from the grid to particles. Losasso, F, J. Talton, N. Kwatra and R. Fedkiw, "Two-way coupled SPH and Particle Level Set Fluid Simulation," (2008) demonstrates a hybrid grid/particle SPH technique that uses FLIP as a coupling mechanism between the grid and is incorporated herein in its entirety and for all purposes. The coupling mechanism addressed in the Losasso paper is aimed at a fluid simulation. The idea is that some parts are represented fully by a grid and some parts are represented by particles. In the present disclosure, any area of space using a grid will also have particles. Additionally, the Losasso paper addresses density targeting for stacking of water particles. In contrast, the present disclosure uses density targeting for stacking of hair.

Given the input candidate velocities $v_i^{*n+1}$ and positions $x_i^n$ from the step represented by Block 304 (FIG. 3), the velocities are rasterized to a grid. It should be appreciated that the candidate positions in the present method include the effects of elasticity due to the springs connecting the particles.

Figure 4:
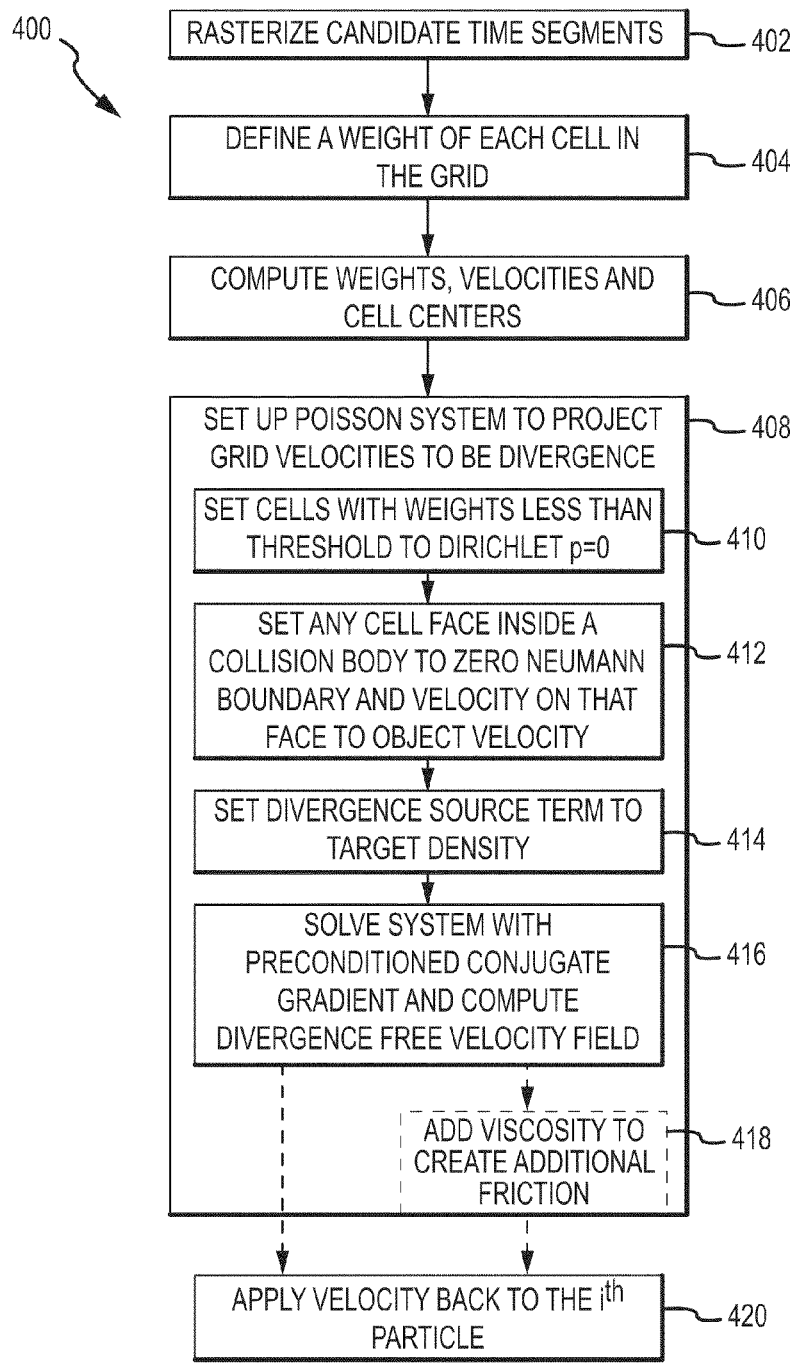
FIG. 4 is a flowchart illustrating the coarse Eulerian method of the flowchart of FIG. 3.

FIG. 4 is a detailed flowchart illustrating a technique 400 for the preconditioning steps of FIG. 3 (i.e., steps represented by Blocks 306-310) in accordance with an example embodiment. The rasterization of the candidate velocities includes rasterization of candidate time $t^{n+1}$ segments (Block 402). The curve segments are rasterized at their candidate locations instead of at their source locations. The curve segments are used instead of rasterizing particles as other FLIP approaches to cover the volume of hair in the case where each segment of the hair curve is sparsely sampled. Consider a segment with particles $(i,j) \in S$ at its candidate positions (i.e. $(x'_i, x'_j) = (x_i^n + \Delta t v_i^{*n+1}, x_j^n + \Delta t v_j^{*n+1}))$. Given a point x in space which has distance $d_{ij}(x)$ to the segment, define a weight $$w_{ij}(x) = \max(0, r - d_{ij}(x)),$$

where r is a user-defined radius of influence for each segment (Block 404). In simulations, $r = 3\Delta x/2$ was used, where $\Delta x$ is the grid size, however, r may be defined to be other suitable values. Generally, the radius should be greater than the size of a grid cell so that it can be seen on the grid, but it should not be much greater than the size of a grid cell.

Once the weight is defined, the rasterized velocity at any point is:

$$v(x) = \frac{\sum_{(i,j) \in S} w_{ij}(x)[(1 - \alpha_{ij}(x))v_i + \alpha_{ij}(x)v_j]}{\sum_{(i,j) \in S} w_{ij}(x)},$$

where $\alpha_{ij}(x)$ is the interpolation fraction of the closest point on the segment. Velocities, weights and cell centers are then computed (Block 406). The velocities and weights are computed on the cell faces for marker and cell (MAC) velocities and the cell centers are computed for density control and separation condition computation. Velocities are computed on a MAC grid. That is, each cell face has a velocity in the direction perpendicular to the plane of the face of the grid cell.

Once the velocities and weights are rasterized, a Poisson system $\nabla^2 p = \vec{\nabla} \cdot v^*_{grid}{}^{n+1}$ is set up (Block 408) to project the grid velocities to be divergence free, as represented in Block 308 of FIG. 3. Within the Poisson system, any cell with a weight lower than a threshold is set as a Dirichlet p=0 condition (Block 410). Generally, the threshold may be a value less than 1. The threshold may be determined empirically to achieve desired results. Additionally, any face that is inside a kinematic collision body is set to a zero Neumann boundary and the velocity on that face is set to the object velocity (Block 412).

A divergence source term is set to a target density (Block 414). In particular, the rasterized cell weights are used to define a density which can be targeted to a user defined density using a divergence source term in the Poisson equation. In near collision objects this can lose effectiveness because kinematic velocity constraints interfere with divergence. The fixed velocities may be modified on Neumann faces if the face's weight is behind the density target. To do so, the constrained velocity is added in the collision body's normal direction. This is analogous to a penalty repulsion in Lagrangian dynamics, but handling it in the Poisson equation means it will be made consistent globally.

Figure 5:
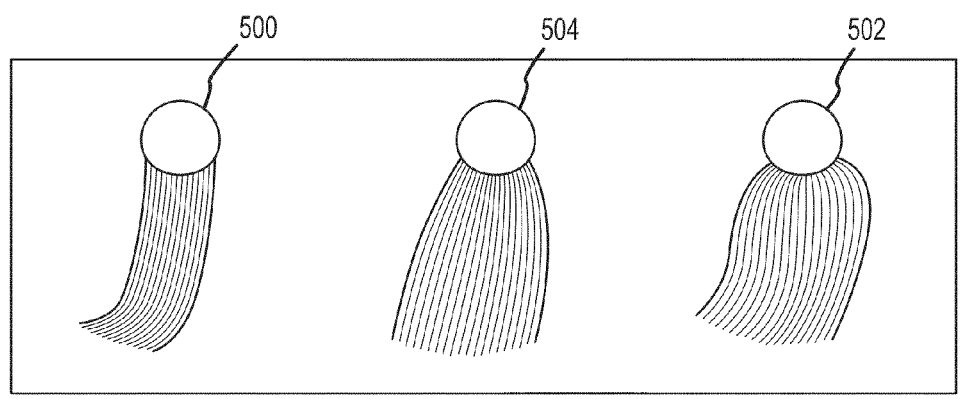
FIG. 5 illustrates density control of simulated hair.

The results of density control can be seen in FIG. 5. In FIG. 5, a high density low volume example 500 is shown on the left-hand side, a high volume low density example 502 is shown on the right-hand side, and a moderate density and volume example 506 is shown in the middle. Hence, using the density control a desired density and volume may be achieved.

Returning again to FIG. 4, after setting the divergence source term to a target density, the Poisson system is solved with a preconditioned conjugate gradient and computing the divergence free velocity field $v_{grid}{}^{n+1} = v^*_{grid}{}^{n+1} - \nabla p$ (Block 416). It should be appreciated that any suitable approach to solve Poisson systems may be used. In this example, the preconditioned conjugate gradient is used with an incomplete Cholesky preconditioner. Other embodiments may use Multigrid, symmetric successive over relaxation (SSOR), or the like.

Optionally, in some embodiments, additional viscosity may also be added to create additional friction (Block 418). Viscosity may be added by solving a viscosity term in the Naview-Stokes equations. This can be solved explicitly by adding viscosity after rasterization but before making the velocity field divergence free. It also can be done fully implicitly or mixed explicit/implicit as in Rasmussen, N., D. Enright, D. Nguyen, S. Marino, N Sumner, W. Geiger, S. Hoon, and R. Fedkiw, "Directable Photorealistic Liquids," EUROGRAPHICS/ACM SIGGRAPH SYMPOSIUM ON COMPUTER ANIMATION (2004), which is incorporated by reference herein in its entirety and for all purposes. Additionally, in some embodiments, the viscosity may be variable. Accordingly, the viscosity of the hair may be adjusted to a desired level to create a desired effect on the movement of the hair in the simulation. In the case of explicit/implicit variable viscosity, this might involve two or more Poisson solves: one for viscosity and one for divergence free solves. That is, the method would proceed thusly, solve the divergence free field, add explicit viscosity, solve implicit viscosity velocities and make divergence free.

After the Poisson system has been solved to compute velocities and account for collisions, FLIP is used to apply the velocity back to the $i^{th}$ particle (Block 420) using the formula $$v_i^{n+1} = \xi [v_i^{*n+1} + (I(x_i^n, v_{grid}{}^{n+1}) - v^*_{grid}{}^{n+1}))] + (1-\xi) I(x_i^n, v_{grid}{}^{n+1}),$$

where $I(x, v)$ is linear interpolation at location x of a vector field v and $\xi$ controls the amount of FLIP. In regard to controlling the amount of FLIP, if $x_i$ was set to 0, purely interpolated grid velocities would be used, giving a very damped look because velocities would tend to be averaged out by the interpolation kernel. If $x_i$ were set to 1, a pure velocity impulse would be added, which would reduce diffusion, but possibly create too unstable of a result. In simulations, a value of $\xi=0.95$ was typically used, however, other values, such as 0.90, or a value equal to or greater than 0.85, may be selected or otherwise empirically determined to achieve a desired result.

Hair Separation in the Volume

Figure 6A:
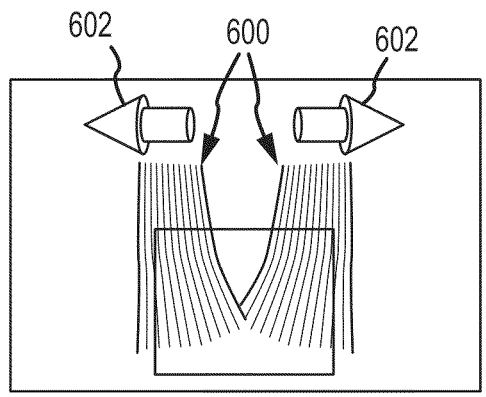
FIGS. 6A-6B illustrate results of a lack of separation control in a volume method when groups of hair have divergent velocities.
Figure 6B:
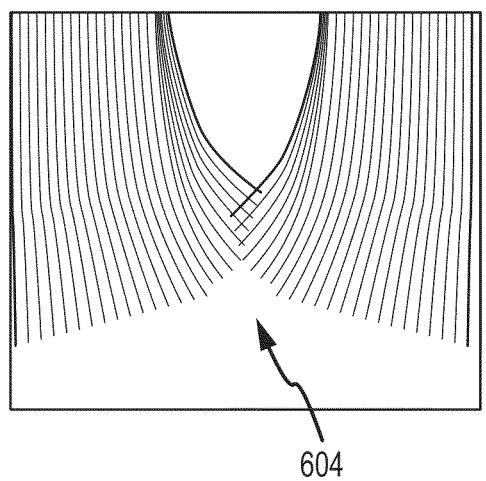

With volume/continuum approaches to hair, nearby hairs are forced to behave similarly. This is desired when hair is under compression because it forces the velocity to be zero at the center, preventing interpenetration; however, but when two regions of hairs have disparate velocity fields, artificial coupling can create undesired sticking. This also appears in fluid techniques when solid objects are coupled to the fluid. FIGS. 6A-6B illustrate an example of undesired sticking. In FIG. 6A, two groups of hair 600 are moving apart (e.g. have divergent velocity fields) as indicated by arrows 602, but some of the hairs 604 from each group are coupled with the other grouping of hair. FIG. 6B is a zoomed view of the undesired sticking.

To prevent unwanted sticking, a hair separation condition may be computed during the rasterization process. Consider a face of the grid having the two incident cell velocities $v_1$ and $v_2$. If $v_1 \cdot n - v_2 \cdot n < \gamma$, where n is the vector pointing from cell 1 to cell 2, then a face is considered separating. This means that the domain of the grid should be decoupled at this face, and cell 1 should not see the pressures on cell 2 and vice versa. The row of the matrix of each cell is modified to see the other cell as a ghost Dirichlet p=0 cell. This is accomplished simply by zeroing $a_{ij}$ and $a_{ji}$ in the matrix (preserving symmetry). This change means the face velocity cannot be projected because the gradient stencil $1/\Delta x(p_2 - p_1)$ is no longer defined. Thus, interpolation of velocities to particles in cells 1 or 2 for FLIP is not defined so these particles are not changed during the FLIP update. Even so, their collisions are resolved by Lagrangian self-collisions.

Figure 7A:
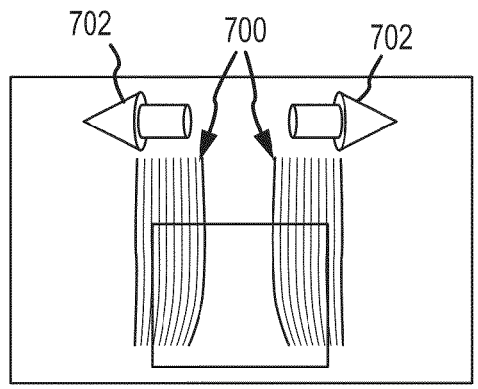
FIGS. 7A-7B illustrate results of separation control in a volume method when groups of hair have divergent velocities.
Figure 7B:
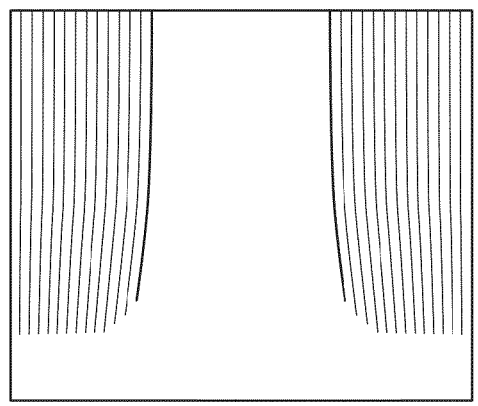
Figure 8:
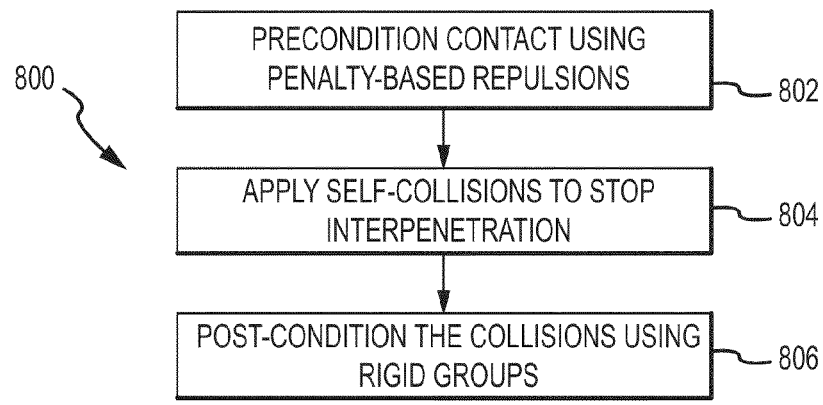
FIG. 8 is a flowchart illustrating the fine Lagrangian technique of the simplified flowchart of FIG. 3.

FIGS. 7A-7B illustrate the results of the hair separation using the foregoing approach. In FIG. 7A two groups of hair 700 are illustrated having divergent velocity fields illustrated by the arrows 702. As can be seen, the groups of hair 700 have no "stray" hair that is sticking with the other group of hair.

Lagrangian Collisions

Once the velocities are interpolated back to particles (Block 310, FIG. 3), a velocity field results that roughly considers self-collision and global collisions. Generally, fine details are missed because it has been computed at the coarser resolution of the grid. If only a few hundred guides were present, repulsions might be a good option for removing the remaining collisions, but at the densities of the present examples (e.g., thousands of hairs), they become impractical because repulsions are proximity based, so as density increases and thickness decreases the repulsions look smaller compared to the velocities. Thus, a self-collisions solver is implemented to handle fine collisions.

Geometric collisions have been studied extensively for cloth simulation because they help prevent visual artifacts. A three stage process may be implemented to help ensure no collisions are missed in applications for hair simulation. FIG.

8 is a flowchart illustrating the three stage process 800. First, contact is preconditioned using penalty-based repulsions that are small enough to prevent visual artifacts (Block 802). Second, self-collisions are applied to stop as much interpenetration as possible (Block 804). In this context, interpenetration refers to hairs in a collision penetrating through the hair edges rather than colliding with at the edges. Third, rigid groups (impact zones) are used as a final safety net, post conditioning the collisions (Block 806).

In other embodiments, one or more of the steps may be replaced and or improved. For example, in one embodiment, the second step (Block 804) may be replaced with a globally coupled collision scheme, as set forth in Sifikis, E., S. Marino and J. Teran, "Globally Coupled Impulse-based Collision Handling Cloth Simulation," ACM SIGGRAPH/EUROGRAPHICS SYMPOSIUM ON COMPUTER ANIMATION (2008), which is incorporated herein in its entirety by reference for all purposes. The rigid impact zones may be improved as set forth in Harmon, D., E. Vouga, R. Tamstorf and E. Grinspun, "Robust Treatment of Simultaneous Collisions," ACM Trans. Graph., 27:3, 1-4 (2008), which is incorporated herein by reference in its entirety for all purposes. Additionally, the first step (Block 802) may be replaced as in Selle, A., J. Su, G. Irving, and R. Fedkiw, "Robust High-Resolution Cloth Using Parallelism, History-Based Collisions and Accurate Friction," R. IEEE TRANSACTIONS ON VISUALIZATION AND GRAPHICS (TVCG), 15(2) 339-350, which is incorporated herein by reference in its entirety for all purposes.

For cloth, improving collisions through better post-conditioning is a useful technique, because failures in repulsions and self-collisions typically do not result in significant visual artifacts. In hair, however, a deluge of repulsions and collisions applied using relatively unstable edge/edge interactions result in configurations that would be difficult to correct with a better rigid group technique. In some embodiments, it may be helpful to turn off collisions in contact cases to prevent these pitfalls.

The placement of volume handling before self-collisions not only allows self-collisions the ability to create a final collision free configuration, but preconditions the collision step, hence replacing a repulsion step. This allows prevention of poor configurations before they create visual artifacts in the self-collision and rigid group steps where the lack of stabilizing point/face interactions in hair make collisions potentially more damaging. In many ways, the volume handling is a better pre-conditioner than proximity-based repulsions because the present volume formulation considers velocities as well as positions.

System and Results

Figure 9:
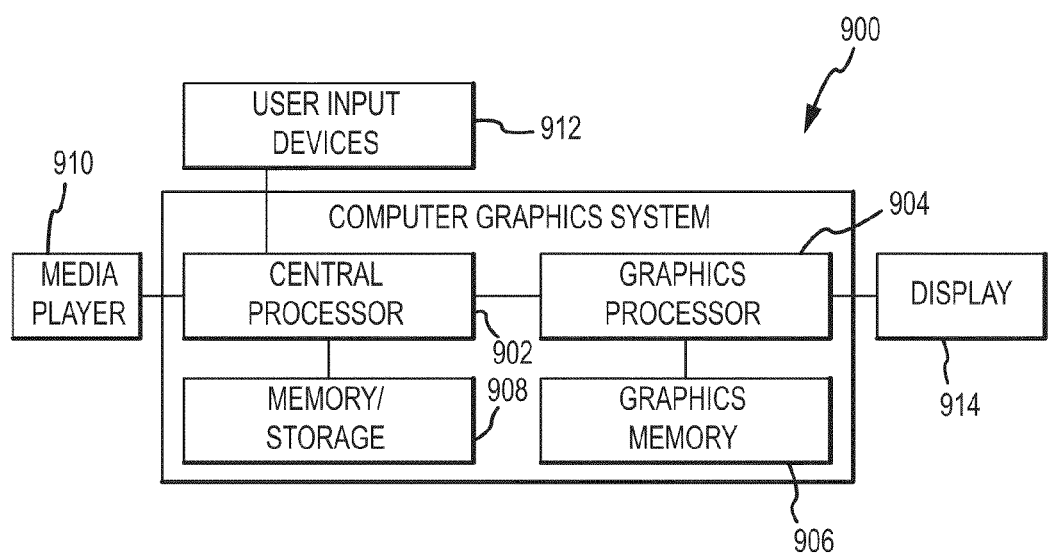
FIG. 9 illustrates an example computer graphics system for hair simulation.

The present techniques for hair simulation may be executed by a computer graphics system. A simplified computer graphic system 900 is illustrated in FIG. 9. Generally, the computer graphics system 900 includes at least one central processor 902 and one or more graphics processor 904. In some embodiments, the at least one central processor 902 and the one or more graphics processors 904 include at least one multicore processor, such as a dual core or quad core processor, for example. In some embodiments, a plurality of processors may be configured to operate in parallel to perform the hair modeling. Additionally, in some embodiments, the central processor 902 and the graphic processor 904 may be part of the same group of processing cores.

The computer graphics system 900 includes a graphics memory 906 coupled directly to the graphics processor 904. The graphics memory 906 functions as execution memory and may have a relatively large memory capacity, as graphics applications are typically memory intensive. Execution memory may include various forms of random access memory (RAM), such as dynamic (RAM), static (RAM), and the like. In addition to the dedicated graphics memory 906, memory/storage 908 is coupled to the central processor 902. In some embodiments, external storage may be provided and communicatively coupled to the computer graphics system. Large amounts of information and data accessible by the processor 902 may be stored on the storage device. The storage device may be a hard disk drive, a solid-state drive, or the like.

Additionally, one or more types of media players/recorders 910 are coupled to the computer graphics system 900, such as DVD drives, Blu-ray Disc™ drives, and so forth. In some embodiments, the one or more media players may be integrated within the system 900. The modeled hair may be stored on one or more types of media using the media player/recorders 910 for playback in other devices and in other environments.

User input may be provided to the system 900 via user input devices 912. The user input devices 912 may include a keyboard, a mouse, a track ball, a stylus, a camera, and so forth. The user input devices 912 allow a user to control the system 900 and provide input to the system to manipulate the data (e.g., the density of the hair) to achieve a desired result.

Further, the computer graphics system 900 includes a display 914, such as a plasma, LCD, CRT, etc., display to graphically display the modeled hair and allow for interaction with a user. As such, the computer graphics system is suited to perform the computation related to the modeling of hair, as well as graphically display the results of the modeled hair, i.e., render the modeled hair on a display.

The present hair simulation technique has been demonstrated with a range of examples in computer graphics system. The technique may be implemented with a standard Lagrangian hair simulator and Eulerian fluid solver and rendered using rendering software such as Pixar's Renderman® software and standard hair shading models. It would be feasible to apply the recent subsurface scattering and shadowing acceleration techniques, some of which might benefit from the presently presented rasterized volume. While no additional strands are generated at render time, traditional interpolation or clumping techniques may be utilized if more strands are desired for rendering detail.

Figure 10:
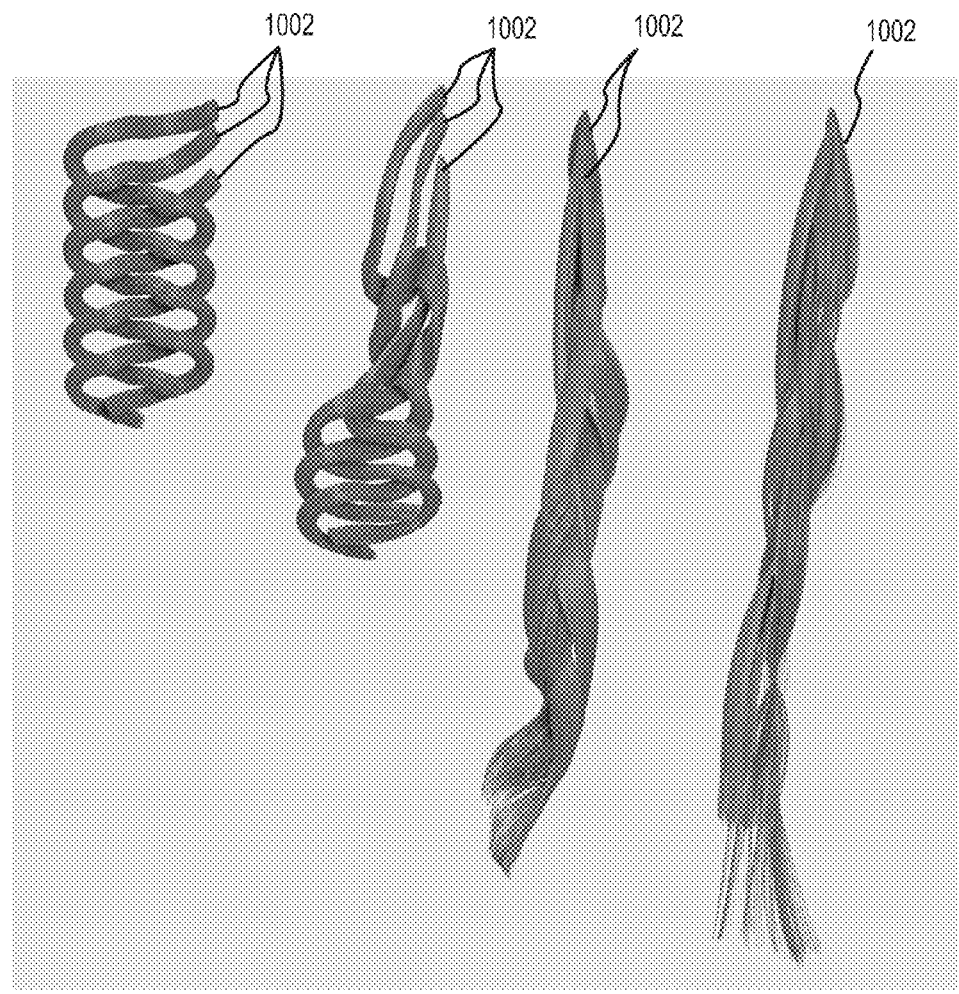
FIG. 10 illustrates an example implementation of the hybrid method of simulation hair using three braided groups of hair.

FIG. 10 illustrates results of complex contact and collision using a braid pattern consisting of 1500 hairs with approximately 100 particles each. Moving left-to-right, three hair sections 1002 begin in a loose configuration with the top particle of each hair fixed. As gravity pulls the hairs downward, a braid pattern emerges due to the Eulerian/Lagrangian collisions.

FIGS. 11A-11D shows the present technique applied to an animated character walking in three frames (1102, 1104, and 1106) with 10,000 simulated hairs. In this example, each frame may represent a time step for which the method of FIG. 3 is applied. The right most frame 1108 is a zoomed view to show the detail achieved with the hair simulation.

Figure 12A:
FIGS. 12A-12B provide a comparison of hair simulated using the hybrid technique and real hair.
Figure 12B:
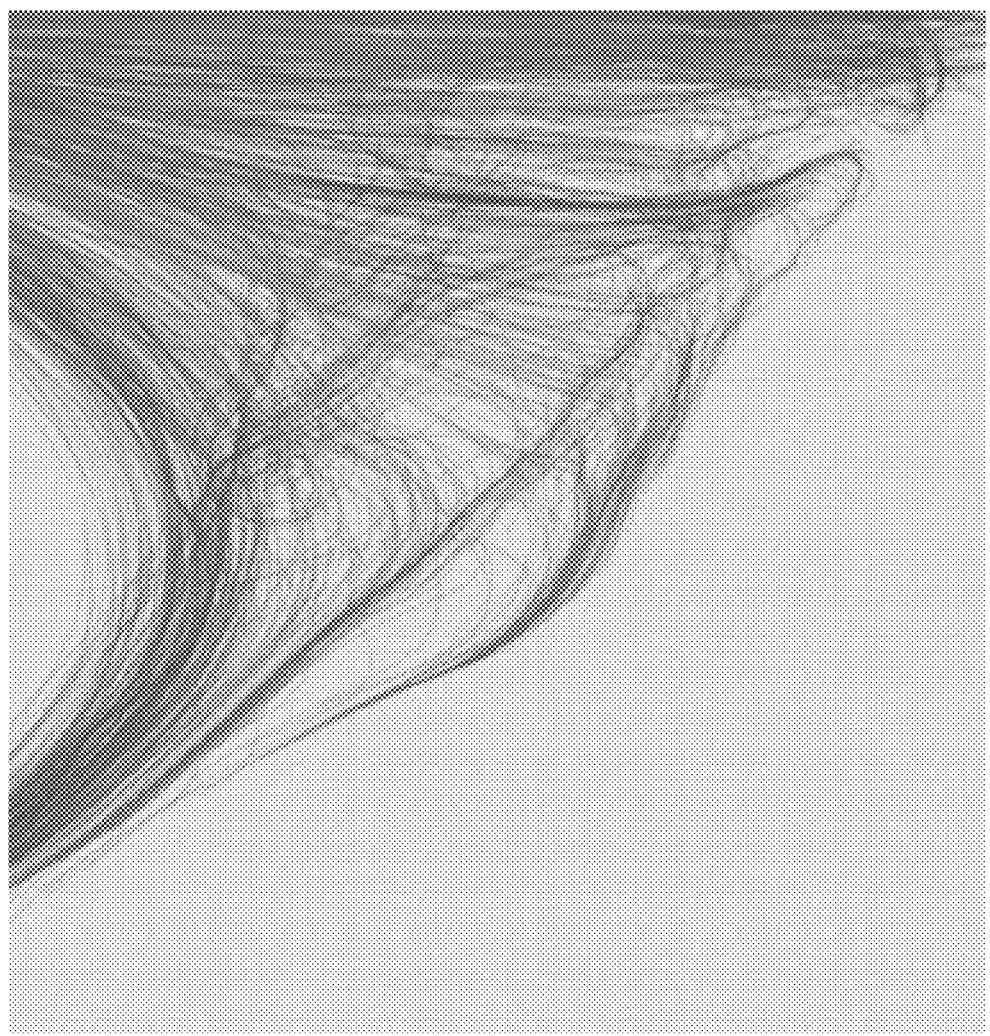

FIGS. 12A-12B illustrate real hair and hair simulated using the present technique, respectively. In each, a group of hair is shown as being lifted. As can be seen, the real hair example in FIG. 12A shows a webbed appearance resulting from complex collisions and contact. In the simulated hair example in FIG. 12B, a similar effect is achieved using the present technique of the hybrid Euler and Lagrangian collision techniques. Thus, the present method compares favorably to real hair behavior.

Figure 13A:
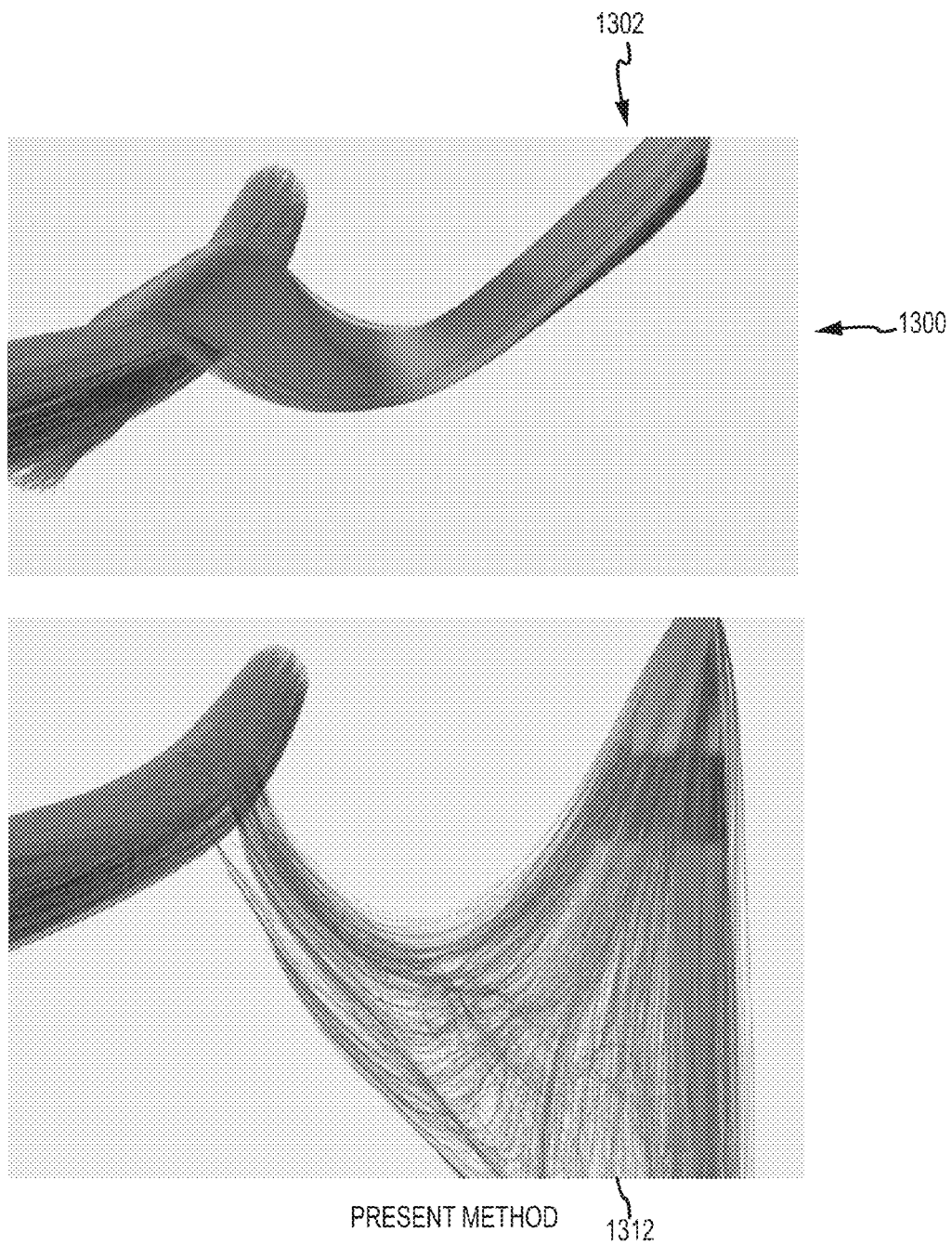
FIGS. 13A-13C provides a graphical comparison of the present hybrid technique for hair simulation with purely Lagrangian and purely Eulerian techniques for hair simulation.
Figure 13B:
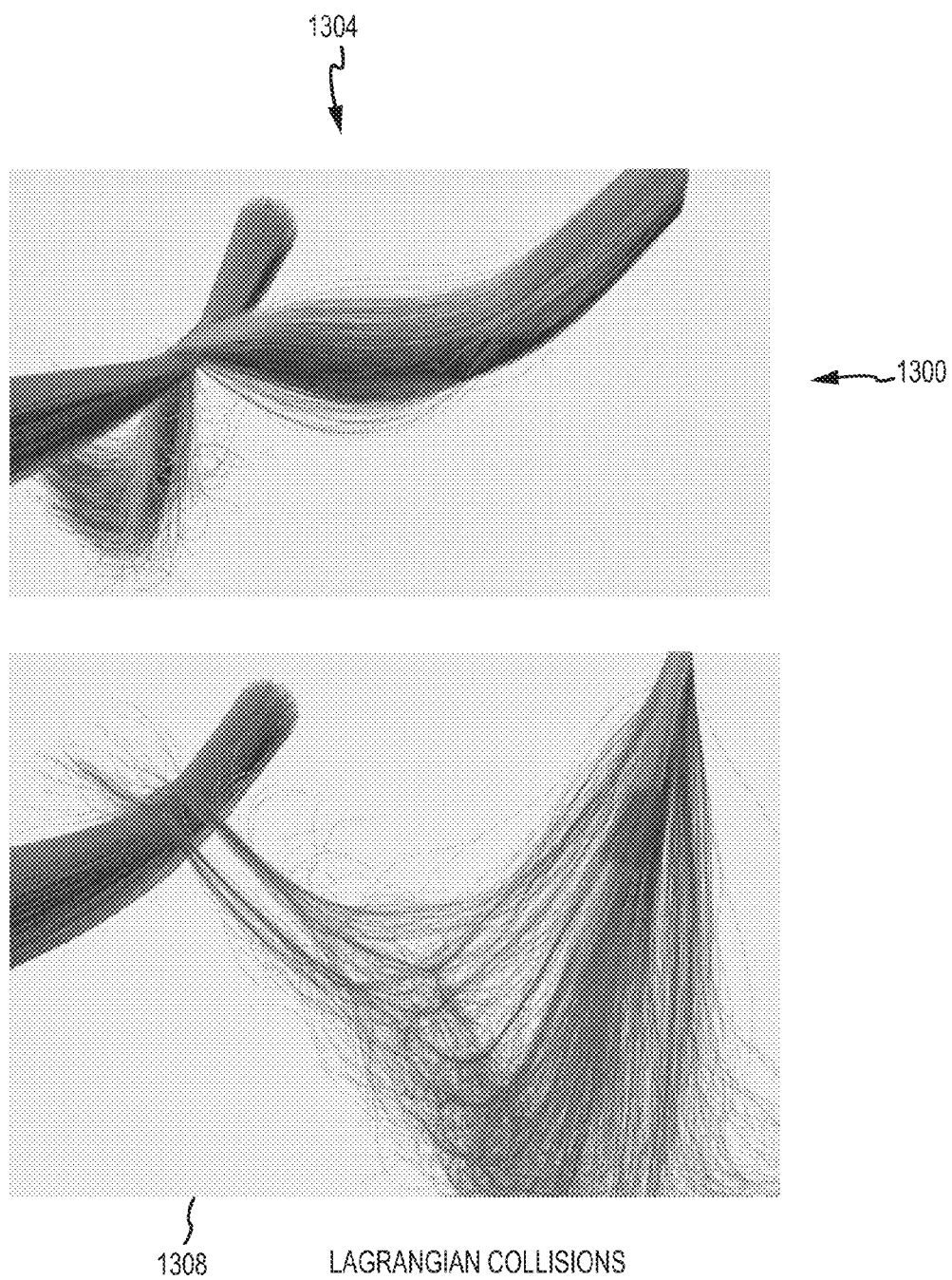
Figure 13C:
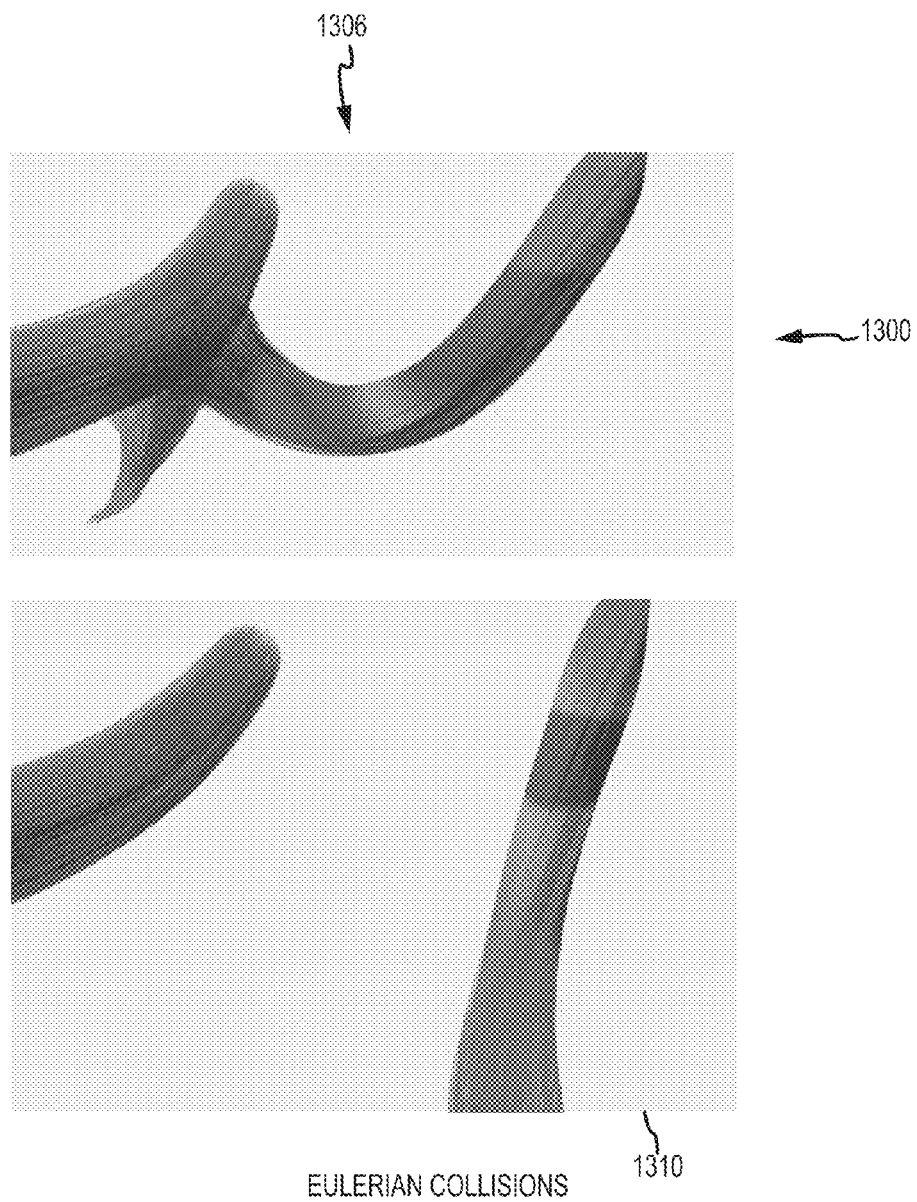

FIGS. 13A-13C compare the present method to Lagrangian and Eulerian collisions alone. FIG. 13A illustrates the present method 1302, FIG. 13B illustrates the pure Lagrangian method 1304, and FIG. 13C illustrates the pure Eulerian method 1306.

For each method, a bundle of 1200 hairs is draped across a perpendicularly hanging bundle of 1200 more hairs (240,000 particles), as shown in the top frames 1300. Whereas purely Lagrangian collisions create highly active collision impulses (FIG. 13B, Frame 1308) due to inadequate hair coupling, purely Eulerian collisions are overly damped and fail to resolve the collisions (FIG. 13C, Frame 1310). The results of the present method show a moderate amount of coupling from the volume together with fine details obtained with Lagrangian collisions (FIG. 13A, Frame 1312) to provide a more natural appearance when compared to the other methods.

A comparison of runtimes for the three techniques shows the purely Eulerian technique has the lowest average runtime per frame (5.6 minutes). Although the present method computes both volumetric and Lagrangian collisions, it is still significantly faster (8 minutes) per frame than Lagrangian collisions alone (13.6 minutes), showing the effectiveness of the Eulerian divergence-free solve as a collision preconditioner. A further breakdown of timing is shown in Table 1. Note that the total time includes time spent on time integration.

TABLE 1

| Technique | Geometric Collisions (m) | Volume Substep (m) | Total Time (m)/Frame |
|---|---|---|---|
| Geometric Collisions only | 9.34 | N/A | 13.64 |
| Volume Only | N/A | 3.55 | 5.67 |
| Hybrid Method | 1.14 | 3.65 | 7.97 |

The simulation time was about 15 minutes (26.9% Lagrangian collisions, 33.9% volumetric, 39.2% mass/spring time integration) per frame for the character on a single machine which is an improvement over the 16-way parallel runtimes of prior techniques. The time-step was determined by the mass spring Courant condition, though in many examples the volumetric step provided some extra stability, allowing relaxation of the time-step restriction.

While the present technique makes high fidelity interactions tractable, there may be some limitations. In particular, the resolution of the volume creates some numerical viscosity and, in particular, angular velocity dissipation. This can be controlled by reducing the use of the volume substep (at the expense of less efficiency) or by increasing the resolution of the grid. Additionally, if the grid is too coarse, hair that becomes severely tangled may not be able to separate.

Several improvements to the technique may be possible. For example, more conservative methods of coupling the volumetric data back to the particle data may be implemented. For example, as the volumetric data may be integrated only to colliding vertices. Accordingly, less volumetric data is interpolated back into the particles from the volume methods. For non-colliding vertices, the original particle data may be used when computing the Lagrangian self-collisions and body collisions.

Also, improved performance may be achieved using several methods. For example, an adaptive octree grid would allow different volume resolutions at different parts of the hair volume. In a large volume of hair, hair that is not visible may not require a highly detailed velocity field. Creating a level set by applying a fast marching method to the previous time steps density volume could derive a refinement criterion. That is, one could create a level set from a rasterized density (weight field) where the density measures where material is. A level set measures a distance to a surface, so the surface of the hair volume is defined. Then, the fast marching method can be used to extend distances to a grid of values as described in Sethian, J. A., PROC. NAT. ACAD. SCI., 93: 4, 1591-1595 (1996), which is incorporated by reference herein in its entirety and for all purposes.

In addition, there are many parts of the present algorithm that are parallelizable (i.e., that may be processed in parallel). The backward Euler solve of each strand of hair is decoupled so each hair could be solved in parallel. Rasterization and solving the Poisson equation is easy to parallelize as well, so it should map well to multicore architectures and graphics hardware. Further, this technique may be applied to cloth as a replacement to the Bridson repulsions to better precondition the cloth collisions.

The present technique hybridizes Lagrangian and Eulerian hair simulation techniques. Implementing FLIP and SPH fluid technology, the present model can be useful as a way of controlling the integration of volume based forces. In addition, the volume computation can ease collision difficulties with hair by acting as an improved preconditioner. Moreover, the factorization of hair interaction into a coarse globally coupled phenomena and a highly detailed Lagrangian view is an effective strategy for balancing efficiency and a high amount of detail.

Although the present disclosure has been described with respect to particular systems and methods, it should be recognized upon reading this disclosure that certain changes or modifications to the embodiments and/or their operations, as described herein, may be made without departing from the spirit or scope of the invention. Accordingly, the proper scope of the disclosure is defined by the appended claims and the various embodiments, operations, components, methods and configurations disclosed herein are exemplary rather than limiting in scope.

The invention claimed is:

1. A hybrid hair simulation method using a computer graphics system, the method comprising:
    generating a plurality of modeled hair strands using a processor of the computer graphics system, each hair strand comprising:
        a plurality of particles; and
        a plurality of spring members coupled in between the plurality of particles;
    determining a first position and a first velocity for each particle in the plurality of modeled hair strands using the processor;
    coarsely modeling movement of the plurality of modeled hair strands as an incompressible fluid with a continuum fluid solver using the processor; and
    computing self-collisions of the plurality of modeled hair strands with a discrete collision model using the processor.

2. The method of claim 1 wherein determining the first velocity or each particle comprises computing backward Euler velocities.

3. The method of claim 2 wherein coarsely modeling movement of the plurality of modeled hair strands with the continuum fluid solver comprises:
    rasterizing the particle velocities defined with backward Euler to a grid; and
    computing divergence free velocities.

4. The method of claim 3 wherein rasterizing the backward Euler velocities to a grid comprises:

computing velocities on a face of a grid cell;
computing a weight of the center of the grid cell; and
computing a weight on a face of the grid cell.

5. The method of claim 4 wherein computing the divergence free velocities comprises:
generating a Poisson system;
setting a grid cell having a weight less than a threshold weight to Dirichlet p=0;
setting a grid cell inside a collision body to a zero Neumann boundary;
setting the velocity on the face of the grid cell inside the collision body to object velocity;
setting a divergence source term to a target density;
solving the Poisson system with a preconditioned conjugate gradient; and
computing a divergence free velocity field.

6. The method of claim 5 further comprising using the rasterized cell weights to define a density, the density being targeted to a user defined density.

7. The method of claim 4 further comprising computing a hair separation during the rasterization process.

8. The method of claim 5 further comprising adding viscosity to the create additional friction.

9. The method of claim 3 further comprising interpolating the divergence free velocities to particles.

10. The method of claim 9 wherein interpolating the divergence free velocities to particles comprises implementing a fluid implicit particle (FLIP) technique fluid using the formula:

$$v_i^{n+1} = \xi[v_i^{*n+1} + (I(x_i^n, v_{grid}^{n+1}) - v^*_{grid}^{n+1}))] + (1-\xi)I(x_i^n, v_{grid}^{n+1}).$$

11. The method of claim 1 wherein computing self-collisions using a Lagrangian collision model comprises performing collision computations comprising:
preconditioning contact using penalty-based repulsions;
apply self-collisions to prevent interpenetration; and
post-condition the self-collisions using rigid groups.

12. The method of claim 1, wherein computing self-collisions of the plurality of modeled hair strands determines one or more direct interactions between two or more hairs in the plurality of hairs.

13. The method of claim 1, wherein coarsely modeling movement of the plurality of hair strands preconditions the self-collisions of the plurality of modeled hair strands.

14. The method of claim 1 further comprising adding torsion to the plurality of modeled hair strands.

15. A Eulerian and Lagrangian hybrid method of artificial hair simulation using a computer graphics system comprising:
determining an initial position and a velocity for each of a plurality of hair strands;
computing a backward Euler solve for each of the plurality of hair strands;
rasterizing the velocity of each of the plurality of hair strands to a three-dimensional grid;
using a volume technique to modify the velocity into a corrected divergence free velocity, wherein the plurality of hair strands is modeled as an incompressible fluid;
interpolating the modified velocity out of the three-dimensional grid;
further modifying the modified velocity to satisfy body and self-collisions; and
computing a final position of each of the plurality of hair strands.

16. The hybrid method of claim 15 wherein interpolating the modified velocity out of the three-dimensional grid comprises using a fluid implicit particle technique.

17. The hybrid method of claim 15 wherein the plurality of hair strands are modeled as a plurality of particles coupled in sequence with springs, wherein every other spring is a bending spring.

18. The hybrid method of claim 15 wherein interpolating the modified velocity out of the three-dimensional grid comprises interpolating the modified velocity only for colliding vertices in a the three-dimensional grid.

19. The hybrid method of claim 15 wherein in a large volume of modeled hair, hair strands that are not visible are nut processed to further modify the modified velocity to satisfy body and self-collisions.

20. The hybrid method of claim 15 wherein computing the backward Euler solve for each of the plurality of hair strands is performed in parallel.

21. The hybrid method of claim 15 wherein rasterizing the velocity of each of the plurality of hair strands to a three-dimensional grid is performed in parallel.

22. A computer graphics system for simulating hair using a Eulerian/Lagrangian hybrid method, the computer graphics system comprising:
at least one processor; and
at least one computer readable medium communicatively coupled to the at least one processor, the at least one computer readable medium including code executable by the at least one processor to:
determine a first collision-free location and a first velocity for each particle of one or more computer generated stands of hair;
rasterize the first velocity to a grid;
compute a second velocity of the computer graphic strands of hair for the second velocity being divergent free;
apply a fluid implicit particle (FLIP) solver to the second velocity to interpolate the second velocity to the particles, wherein the one more strands of hair are modeled in the FLIP solver an incompressible fluid;
compute body and self-collisions of the one or more strands of hair; and
determine a final position of the one or more computer graphic strands of hair.

23. The computer graphics system of claim 22 wherein the code is configured to use the final position as a new first position and iteratively determine a new final position.

24. The computer graphics system of claim 23 further comprising a display configured to sequentially output the iterative final positions to the display as a graphical representation of the one or more strands of hair.

* * * * *